A. M. SUNDBORG.
METHOD OF TEMPERING STEEL.
APPLICATION FILED MAR. 22, 1910.
974,099.  Patented Oct. 25, 1910.
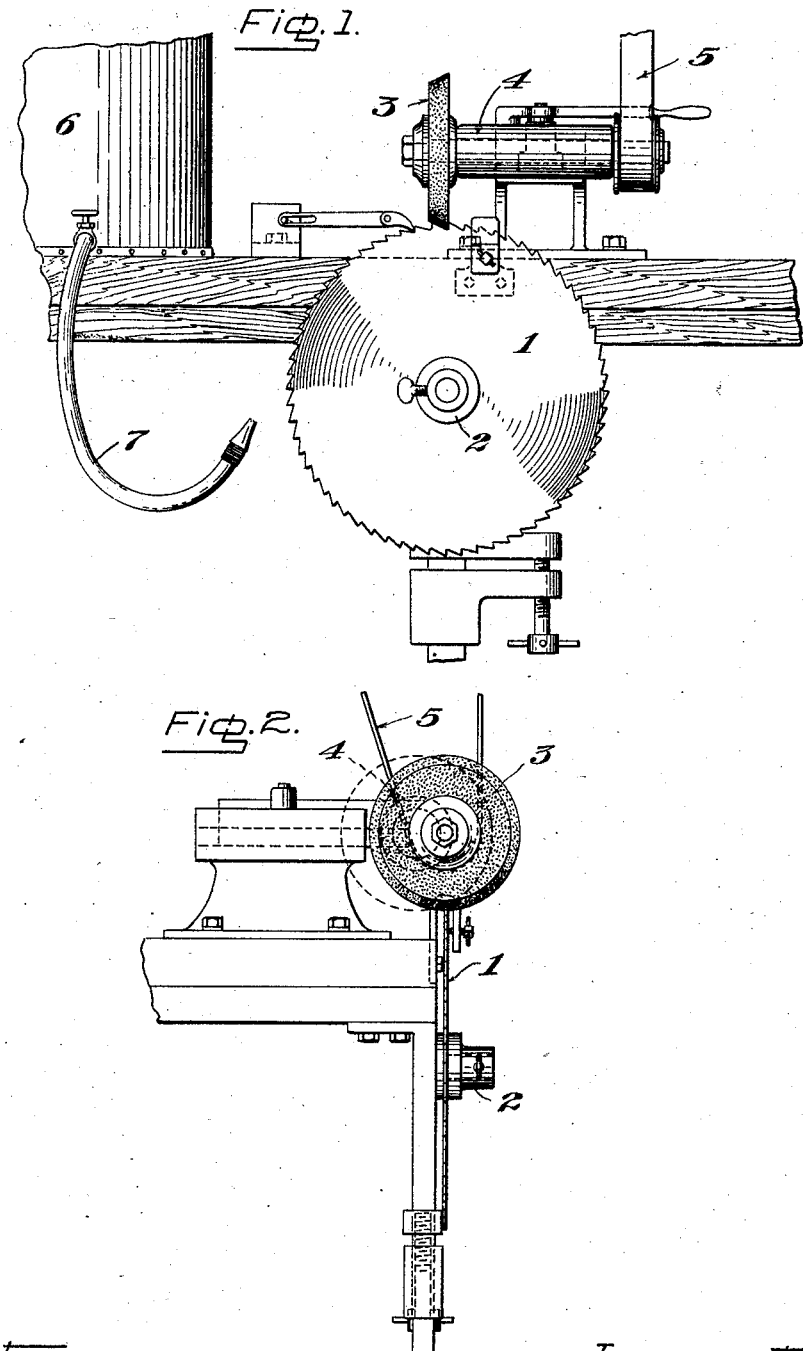
Witnesses:
M. G. Crozier
Harold S. Lyon
Inventor,
Andrew M. Sundborg,
by his Attys.
Mitchell, Chadwick & Kent

UNITED STATES PATENT OFFICE.

ANDREW M. SUNDBORG, OF DORCHESTER, MASSACHUSETTS.

METHOD OF TEMPERING STEEL.

974,099.  Specification of Letters Patent.  Patented Oct. 25, 1910.

Application filed March 22, 1910. Serial No. 550,820.

*To all whom it may concern:*

Be it known that I, ANDREW M. SUNDBORG, a citizen of the United States, residing at Dorchester, in the county of Suffolk and State of Massachusetts, have invented new and useful Improvements in Methods of Tempering Steel, of which the following is a specification.

This invention relates to an improved process of tempering saws and the like, the word "tempering" here signifying the production of a desired degree of hardness. More particularly, and as the application of the process is herein set forth, it relates to the tempering of saw-teeth.

Hitherto, when the teeth of a circular saw have needed re-tempering, it has been necessary for the user to return the saw to the factory or send the same to other places at a distance where are facilities for performing the different operations, according to the methods heretofore known in practice. This requires not only the maintenance of suitable furnaces, baths and incidental apparatus for heating the entire saw and cooling special parts of it; but also involves the expense of the process and of the transportation for that purpose and the delay of interruption to the business of the person whose saw requires tempering. The present invention was devised primarily to overcome these objections in the case of circular saws, but, as will be obvious from the description which follows, it may be practiced in respect to other tools or articles which are to be tempered. It dispenses with the apparatus, the fuel and the other arrangements customarily employed and enables the tempering to be done by any competent workman in his own shop without inconvenience or delay.

The accompanying drawing represents apparatus by which the improved process may be effected, in which—

Figure 1 is a front elevation and Fig. 2 is a side elevation.

These results are accomplished by the aid of friction to produce heat and by proceeding as follows: Let it be assumed that a circular saw has been used until it requires re-tempering. I place the saw in any suitable holder such as is customarily used for holding a saw for sharpening its teeth, and, the body of the saw being cold, I apply to one of the teeth an emery wheel having a somewhat dull and smooth surface, whereby considerable friction is generated without cutting the surface very much. I continue this until the tooth becomes heated to a high temperature. The heat travels inward from the surface where the friction is generated, and, as the heating progresses, the degree of temperature may be judged by observing the color, as is already well known in the art of tempering, the heat being greatest close to the edge. When this part of the metal has acquired a temperature suitable to give the desired degree of hardness according to the customary practice of the art of tempering, I withdraw the friction producing means and apply a cooling fluid such as water from a hose. The tempering is then completed and the operation may be repeated with the other teeth in succession. The cooling of each tooth requires but a brief time, for example, only two or three seconds, and consequently one may proceed rapidly from tooth to tooth until the tempering has been completed. It is then usually desirable to remove, by grinding, the bur which has been caused by the emery wheel in the tempering operation, and to proceed to sharpen the tooth as usual.

In cases where the character of the work requires it I may use a sharper cutting wheel for the first stage of the tempering process, and while heating the steel cut it to a different form as, for example, by deepening the space between teeth of a saw, so that each projects farther.

The drawing illustrates apparatus adapted to be employed in carrying out my process.

In the drawing 1 indicates a saw held in position on an arbor by an adjustable clamp 2. An emery wheel 3 driven by a belt 5 is mounted in a movable bearing 4 by which it may be moved toward and from the saw.

6 indicates a tank for the supply of liquid such as water, and the hose 7 means by which the liquid may be readily applied to the heated portion of the saw; but it will be understood that any other method for applying a sufficient body of water suddenly would serve the purpose.

I claim as my invention and desire to secure by Letters Patent:—

1. The process of tempering which consists in holding stationary the body to be tempered; applying continuously to a minor part thereof the friction of a body moving in contact with the surface of such part till heated to a suitable temperature, the adjacent parts being relatively cool, and then suddenly cooling the part so heated by friction.

2. A process of tempering steel which consists in rubbing a dull abrasive material on the surface of the steel, thereby producing friction and heat in the steel adjacent to said surface, the body of the piece being relatively cool, and then applying a cooling fluid, thereby suddenly cooling said heated portion; said rubbing being applied continuously on the part to be tempered.

3. The herein described process of tempering saws which consists in concentrating heat upon a tooth separately by the application of friction, the body of the saw remaining relatively cool, the heating of a tooth being followed by the sudden application of cooling means.

4. The herein described process of tempering saws which consists in applying to the teeth successively a dull abrasive material producing friction concentrated continuously on a tooth individually and thereby heating the tooth to which it is applied, the body of the saw remaining relatively cool, such application to a tooth being followed by the sudden application of cooling means.

Signed by me at Boston, Mass., this 21st day of March, 1910.

ANDREW M. SUNDBORG.

Witnesses:
EVERETT E. KENT,
JOSEPH T. BRENNAN.